UNITED STATES PATENT OFFICE.

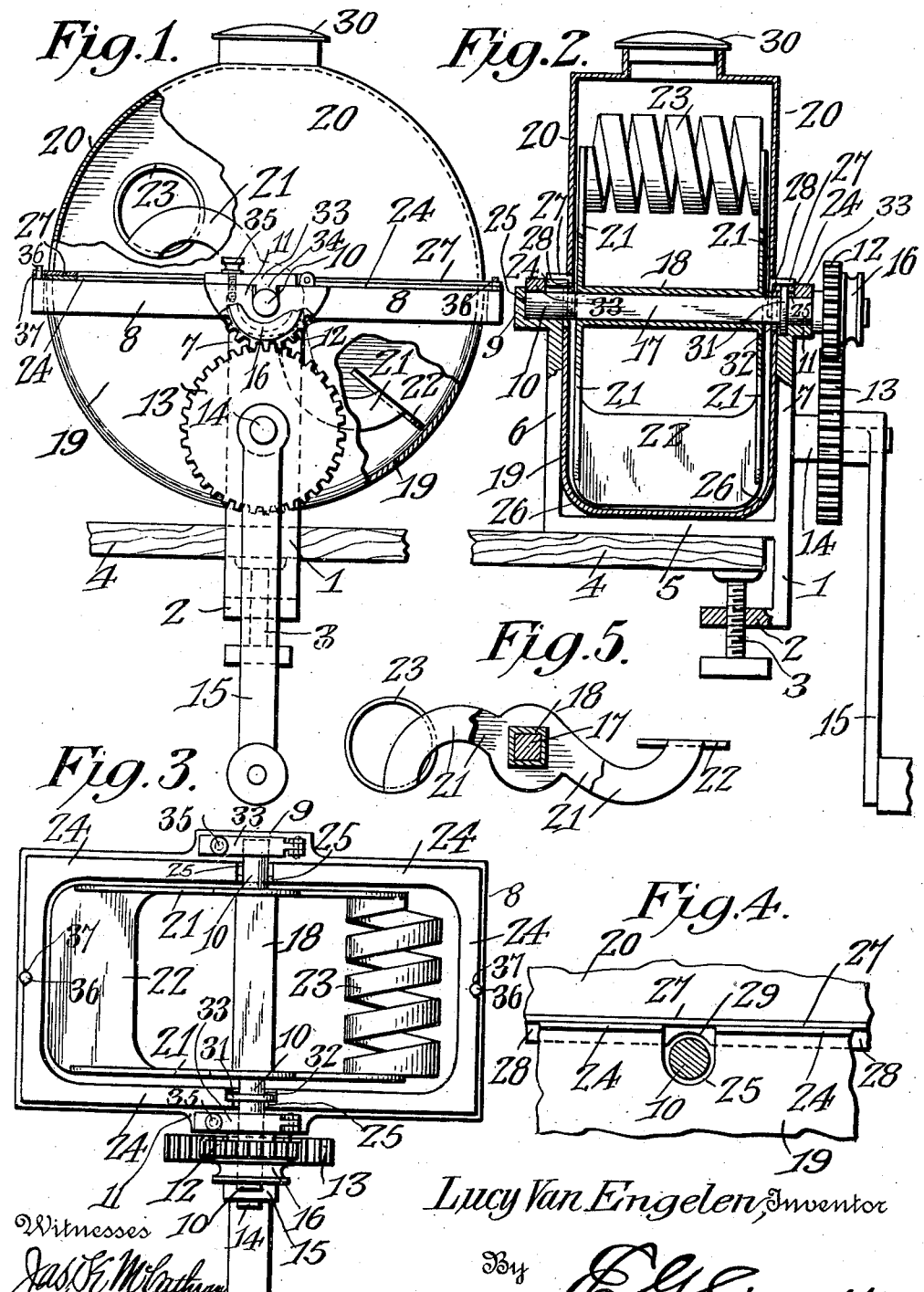

LUCY VAN ENGELEN, OF MISSOULA, MONTANA.

CAKE-MIXER.

991,253.   Specification of Letters Patent.   Patented May 2, 1911.

Application filed June 29, 1910. Serial No. 569,566.

*To all whom it may concern:*

Be it known that I, LUCY VAN ENGELEN, a citizen of the United States, residing at Missoula, in the county of Missoula and State of Montana, have invented a new and useful Cake-Mixer, of which the following is a specification.

This invention relates to improvements in cake mixers and the object of the invention is to provide a device in which dough or batter may be rapidly and thoroughly mixed and beaten with the expenditure of little labor by the operator.

A further object of the invention is to provide a flexible or resilient beater which will yield slightly to the resistance afforded by the dough or batter, but will be drawn through the same by the operating force so that the constituents of the dough or batter will be thoroughly commingled and the dough rapidly brought to the proper consistency so that the cake made therefrom will be light, wholesome and pleasant to the taste.

A further object of the invention is to provide a scraper by which the batter or dough immediately adjacent the hopper or pan will be removed therefrom so that the entire quantity of batter placed within the pan will be acted upon by the beater.

A further object of the invention is to provide a device for the purpose set forth in which the several parts may be readily assembled and disassembled so as to facilitate cleaning, and all these objects and such other incidental objects as may hereinafter appear are attained in the use of the mechanism illustrated in the accompanying drawings.

The invention consists in certain novel features of the same which will be hereinafter first fully described and then set forth more specifically in the appended claims.

In the drawings,—Figure 1 is a side elevation, partly broken away, of a cake mixer embodying my invention. Fig. 2 is a view showing the supporting frame partly in elevation and partly in vertical section and showing the pan and cover in transverse section. Fig. 3 is a plan view of the frame and pan with the cover removed. Fig. 4 is a detail elevation of a portion of the pan and the cover therefor with the driving shaft in its relative position and in section. Fig. 5 is a detail view of the revolving beater and scraper.

In carrying out my invention, I employ a frame or bracket 1 which is provided with a lug 2 having a clamping screw 3 mounted therein and adapted to engage the under side of a table or other support, indicated at 4, so as to clamp the same against a cross bar 5 of the bracket, as will be readily understood on reference to Fig. 2. The cross bar 5 extends between standards 6 and 7 constituting the sides of the frame and constructed at their upper ends to provide bearings for the operating shaft. An open frame 8 extends from the upper ends of the standards 6 and 7 so as to fit around and support the pan of the mixer, as will be presently described. At the junction of the frame 8 and the standard 6, I provide a lateral boss or socket 9 which is adapted to receive one end of the driving shaft 10, as shown in Fig. 2. At the junction of the frame and the upper end of the standard 7, I provide an open off-set 11 which receives the outer end of the driving shaft so as to support the same, as will be readily understood on reference to Fig. 2. The driving shaft 10 has cylindrical ends which rest upon the off-set 11 and in the socket 9 so as to rotate freely thereon, and at the end of the said shaft adjacent the off-set 11 I secure a pinion 12 which meshes with a gear wheel 13 mounted on a stub shaft 14 projecting from the standard 7 below the off-set 11, as shown clearly in Figs. 1 and 2. A crank or other suitable handle 15 is connected with the gear wheel 13 so as to rotate the same and thereby impart motion to the driving shaft through the pinion 12, as will be readily understood. Where power is obtainable, the gear wheel 13 and the handle 15 therefor may be dispensed with and the shaft 10 rotated through the medium of a pulley 16 and a cord or belt passing around the same and connected to a motor, as will be readily understood.

The shaft is provided between its ends with an angular portion 17 upon which is fitted the central transverse angular sleeve 18 forming the hub of the beater so that the rotation of the shaft will be applied directly to the beater and the same, consequently, caused to rotate within the pan 19 and the cover 20. This beater comprises arms 21 extending in opposite directions from the hub 18 at the ends of the same, and the outer ends of one pair of arms are connected by a blade or scraper 22 which is disposed in a plane radial to the driving shaft and has its outer edge shaped to correspond to the transverse outline of the pan 19 so that when the scraper is at its lowest point it will bear against the pan and, consequently, scrape therefrom the dough or batter resting thereon. The pan and its cover are arranged slightly eccentric to the operating shaft so that the scraper will not bear against the cover, and consequently unnecessary wear of the parts will be avoided. At the opposite ends of the side arms I provide the flexible beater 23 which, in the form illustrated, consists of a spiral strip extending between the ends of the arms 21 and having its extremities secured thereto. This spiral strip is unsupported except at its ends so that its intermediate portion may readily yield to the impact against the dough or batter, but it will be forced to travel through the said dough or batter by the power applied thereto through the driving shaft so that the several coils of the spiral will be caused to cut through the dough and impart to the same a regular whirling motion as the result of which all the particles will be taken up and mixed, and the formation of large heavy lumps within the dough or batter will be prevented. The spiral formation of the beater will impart to the same a certain amount of resiliency so that after the beater emerges from the body of the dough or batter, it will resume its normal shape so that the action upon the dough will be the same at each revolution of the beater. The pan 19 is a substantially semi-cylindrical hopper resting upon the cross bar 5 and held against lateral movement thereon by the standards 6 and 7. Along its upper edge the pan is provided with a horizontal flange 24 which rests upon the upper edge of the frame 8 so that the pan will be supported by the said frame.

In the side edges of the pan at the centers of the same I provide notches 25 which permit the passage of the driving shaft 10, but are of such depth as to extend slightly below the socket 9 and off-set 11 so that the weight of the driving shaft will be borne entirely by the said off-set and socket and will not be put upon the pan so as to bend or otherwise injure the same, it being understood that the pan is preferably of enameled ware. As shown in Fig. 2, the bottom of the pan has its corners rounded off, as indicated at 26, so that the collection of portions of the batter or dough in the corners will be prevented and the cleaning of the pan after its use will be facilitated. The cover 20 is provided at its lower edge with a horizontal flange 27 adapted to rest upon the flange 24 of the pan, and also with a depending lip or flange 28 adapted to engage the inner surface of the pan, as shown in Fig. 4, so that the pan will serve to maintain the cover in its proper position and any dough or batter which may be splashed up into the cover will be caused to drop back into the pan without escaping through the joint between the pan and the cover. The flange 28 of the cover is provided with a slight recess 29 adapted to extend over the driving shaft, as shown in Fig. 4. The cover is also provided at its highest point with a cap 30 which will permit the examination of the dough or batter at any time without necessitating the removal of the cover from the pan. The dough or batter may be thus kept entirely free from the influence of the outer air until it has been thoroughly kneaded and is ready for baking. In order to prevent the driving shaft moving longitudinally out of its position in the pan, I provide thereon a collar or annular flange 31 which is adapted to fit between the frame and the outer surface of the pan within a recess 32 in the frame, as shown in Fig. 2. To prevent the shaft rising from its bearings when the device is in use, a cap 33 is hinged upon the upper side of the frame and extends across the offset 11, as shown in Fig. 1. This cap is provided with a lug 34 on its under side adapted to bear upon the shaft and a thumb-screw 35 is mounted in the end of the cap and adapted to engage the frame to secure the cap against accidental movement.

To maintain the pan in its proper relation to the frame, lugs 36 are provided on the ends of the frame to be engaged by notches 37 in the pan, as will be readily understood.

When it is desired to use the device the pan is placed between the standards 6 and 7 with its flange 24 resting on the frame 8, as will be readily understood. The driving shaft is then inserted through the hub or central sleeve 18 of the beater and the ends of the shaft are then engaged in the socket 9 and off-set 11, as will be readily understood, the lowering of the shaft into its position bringing the pinion 12 into mesh with the gear wheel 13. The shaft is inserted through the hub or sleeve 18 until the collar 31 on the shaft bears against the sides of the beater and the said collar thus serves the function of a stop or guide to determine when the shaft and the beater are in their proper relative positions. When the shaft is placed in its position on the off-set and the socket 9, the collar 31 will bear against the inner surface of the pan so as to prevent longitudinal movement of the shaft in one direction, while longitudinal movement of the shaft in the other direction is prevented by the end of the shaft bearing against the end wall of the socket 9, as clearly shown in Fig. 2. The cover 20 is then placed in position upon the pan and the driving shaft rotated through the application of power thereto by means of either the pulley 16 or the crank handle 15, as will be readily understood. The rotation of the driving shaft will, of course, cause the beater to rotate rapidly within the pan and cover and alternately mix the batter and scrape the same from the pan so that the entire quantity of the batter or dough will be turned and beaten in an expeditious and efficient manner.

My device is exceedingly simple in its construction and the arrangement of its parts, and may be readily operated by any person, while the ease with which the several parts may be assembled and disassembled, facilitates the cleaning of the same and reduces the labor of keeping the device in a sanitary condition.

The advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described my invention, what I claim is:—

1. A cake mixer comprising a pan, a beater therein, and a support for the beater about which it is movable in an orbital path, said beater comprising an open spiral described about an axis movable in said orbital path in concentric relation to the axis of rotation of the beater.

2. In a cake mixer, a suitable pan, and a beater mounted therein for orbital movement about an axis central to the pan, said beater comprising a flexible open spiral having its axis of generation parallel with the axis of rotation of the beater.

3. In a cake mixer, a rotatable beater comprising a strip wound into an open flexible spiral, and a support for the strip connected to the ends of the spiral and rotatable about an axis parallel with the axis of generation of the spiral and spaced therefrom, whereby the beater may be made to traverse an orbital path.

4. In a cake mixer, a frame, a suitable pan within the frame, a shaft mounted upon the frame and extending through the pan, means for rotating the shaft, and a flexible beater mounted on the shaft and comprising an open spiral having its axis of generation parallel with and spaced from the shaft.

5. In a cake mixer, a suitable pan, a shaft mounted in the pan, a flexible beater carried by the shaft and comprising an open spiral with its axis of generation parallel with the shaft, and a scraper carried by the shaft and having its active portion at a greater radial distance from the shaft than the beater.

6. In a cake mixer, a suitable pan, a shaft extending through the pan, a flexible beater carried by the shaft and comprising an open spiral having its axis of generation parallel with the shaft, and a scraper carried by the shaft at a point diametrically opposite from the beater, the active portion of the scraper conforming in contour to the pan, and at a greater radial distance from the shaft than the beater.

7. The combination of a frame, a pan resting on the frame, a shaft mounted in the frame and extending through the pan, said shaft having an angular central portion, an angular sleeve fitted on the said central portion, arms extending radially from the said angular sleeve, and a flexible beater secured to and extending between the ends of said arms.

8. The combination of a frame, a pan supported by the said frame, a shaft mounted in the frame and extending through the pan and having one end bearing against the frame, a collar on the shaft between the frame and the pan, means for rotating the shaft, and a flexible beater carried by the said shaft to be rotated within the pan.

9. A cake mixer comprising a frame, a pan resting on the frame, a cover supported by the pan and fitting within the same, a shaft mounted in the frame and passing through the pan but out of contact therewith, one end of the shaft bearing against the side of the frame, a collar on said shaft adjacent the opposite end of the same between the frame and the pan, means for rotating the said shaft, and a beater carried by the said shaft within the pan and the cover.

In testimony, that I claim the foregoing as my own, I have hereto affixed my signature in the presence of two witnesses.

LUCY VAN ENGELEN.

Witnesses:
  I. D. Peare,
  Wm. T. Grayhead.